Jan. 23, 1945.  W. G. CLARK  2,367,928
APPARATUS FOR GENERATING HYDROGEN AND CARBON FROM HYDROCARBON GAS
Filed Oct. 18, 1940  2 Sheets-Sheet 1

Inventor
Walter Gordon Clark
By Lyon & Lyon
Attorneys

Jan. 23, 1945. W. G. CLARK 2,367,928
APPARATUS FOR GENERATING HYDROGEN AND CARBON FROM HYDROCARBON GAS
Filed Oct. 18, 1940 2 Sheets-Sheet 2

Inventor
Walter Gordon Clark

By Lyon & Lyon
Attorneys

Patented Jan. 23, 1945

2,367,928

UNITED STATES PATENT OFFICE 2,367,928

APPARATUS FOR GENERATING HYDROGEN AND CARBON FROM HYDROCARBON GAS

Walter Gordon Clark, Los Angeles, Calif., assignor, by direct and mesne assignments, to Clark-iron, Inc., a corporation of Nevada Application October 18, 1940, Serial No. 361,702

3 Claims. (Cl. 23—288)

This invention relates to a method and apparatus for generating hydrogen and carbon from hydrocarbon gas in which the catalytic action of iron is employed.

When hydrocarbon gas and iron in the proper condition are brought into contact at a suitable temperature, the iron acts as a catalytic agent for breaking the molecules of the hydrocarbon gas into hydrogen and carbon, depositing the carbon into the form of carbon black or lamp black on the iron and liberating hydrogen. If the iron catalyst is retained in contact with the hydrocarbon gas, it soon becomes inactive as a catalytic agent. Where, however, freshly reduced iron is continuously passed countercurrent to the movement of the hydrocarbon gas in a reaction chamber, the effectiveness of the catalytic decomposition of the hydrocarbon gas can be continuously maintained.

In my prior United States Patents Nos. 2,144,618 and 2,166,207 I have shown a process and apparatus by means of which an iron ore is continuously reduced to iron by the action of hydrogen, the reduced ore in turn acting as a catalytic agent for continuously reducing a hydrocarbon gas to hydrogen so as to supply the the necessary hydrogen for the ore reducing operation. In the process and apparatus of those patents the produced hydrogen is in the act of reducing the ore converted to water, so that the products of the processes and apparatus of such prior patents are in the main reduced iron, carbon black, and water.

It is a general object of the present invention to provide a process and apparatus by means of which hydrocarbon gases may be decomposed to hydrogen and carbon which constitute the useful products of a process. Accordingly, in the process and apparatus of the present invention, iron is supplied to the conversion chamber in place of iron ore, as in my prior Patents Nos. 2,144,618 and 2,166,207, and the processes and apparatus are operated so that the iron which is intended to act as the catalytic agent may be continuously moved through the conversion chamber countercurrently to the flow of hydrocarbon gas or the flow of the hydrogen produced by the decomposition action, and by means of which the iron may be continuously withdrawn from the conversion chamber separated from the produced carbon black subjected to a limited surface oxidizing action and the necessary reducing action to restore its efficiency as a catalytic agent and re-circulate it to the conversion chamber.

The method and apparatus of the present invention will be clearly understood from the following description of the preferred example of processes and apparatus embodying the invention. For this purpose, I have hereafter described the preferred methods of the apparatus of the present invention in connection with the accompanying drawings, in which Figure 1 is an elevation partially in vertical section.

Figures 1, 4:
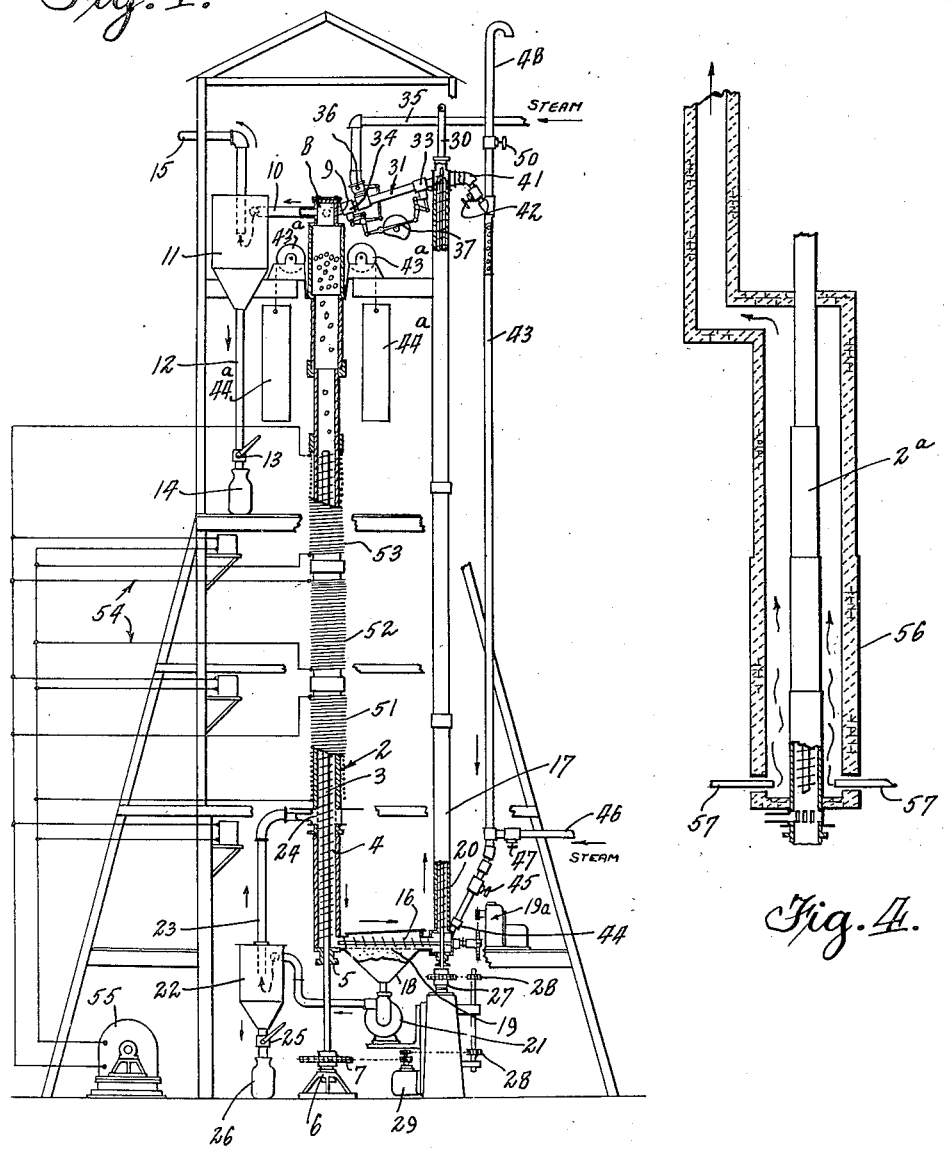
Figure 4 is a fragmentary vertical section of a modified form of the reaction chamber.
Figure 2:
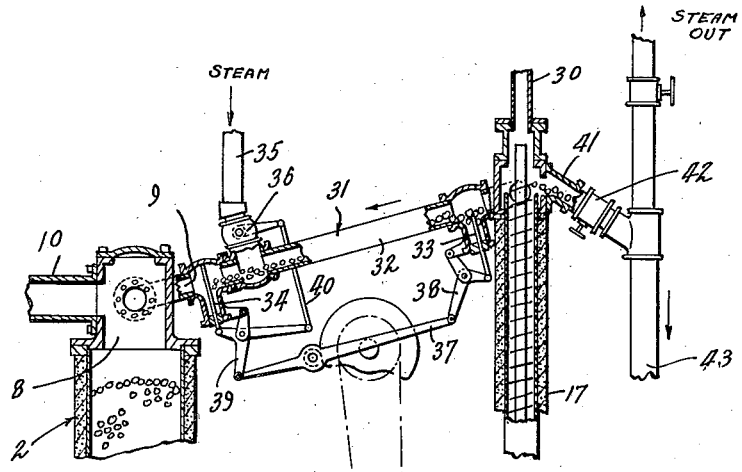
Figure 2 is an enlarged fragmentary elevation, partially in section, of the iron feeding mechanism.

Referring to the drawings, the apparatus comprises a heat resisting cylinder 2 of either parallel side walls or the side walls may incline to a greater diameter towards the bottom either continuously or in steps. This heat resisting cylinder 2 provides a conversion chamber for the apparatus. The cylinder 2 is indicated as suspended by pulleys 43ª and counterweights 44ª to allow for expansion under heat. Within the conversion chamber there is provided a rod or shaft 3 supporting a helically shaped vane 4. The rod 3 extends through a packing gland 5 and is supported at its lower end by a bearing 6 and provided with means such as a gear 7 by which the same may be continuously rotated during operation to control the speed of movement of solid material downwardly through the conversion chamber.

In the operation of the process and apparatus of the present invention the space between the shaft of the helix and the walls of the conversion chamber may be filled with steel or alloy steel balls. The balls are fed into the top of the conversion chamber and, in certain cases, may be allowed to move by gravity on the angle of the helix from the top to the bottom of the conversion chamber, or the helix may be rotated either continuously or intermittently to avoid clogging or filling the interstices with deposited carbon.

The balls are fed through an inlet line 9 into the top of the conversion chamber into a separating head 8, from which gas moving upwardly through the mass of balls is allowed to pass out through outlet 10. The gas outlet 10 leads to a carbon separating chamber 11, which is indicated as provided with a tail pipe 12 having a valve 13 at its lower end, by means of which the carbon from the extracting chamber 11 may be periodically discharged into a packaging member 14. The gas which is separated from the carbon is discharged through line 15.

The balls passing through the conversion chamber 2 are discharged by a horizontal conveyor 16, driven by drive means 19a, into a vertical elevator 17. The horizontal conveyer 16 passes through a carbon separating hopper 18, which is indicated as provided with a screen 19 below the conveyor suitable for preventing the balls from passing downwardly through the hopper, but which screen is effective particularly under the pressure and flow of gas through the hopper for passing carbon.

Figure 3:
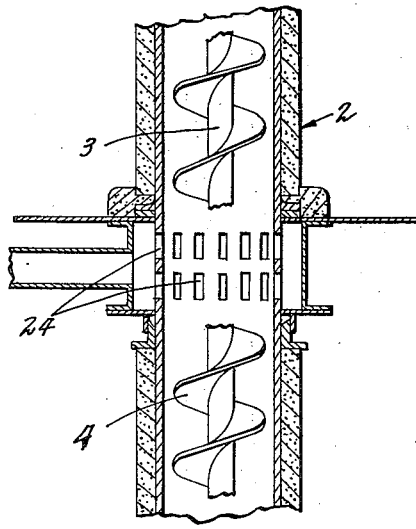
Figure 3 is an enlarged fragmentary elevation of a gas inlet to the reaction chamber.

In the elevator 17, which may be of the helical type and provided with a rotating elevating helix 20, the balls pass upwardly in heat exchange relation with a countercurrent and downwardly moving hydrocarbon gas which is to be passed to the conversion chamber. The gas moves countercurrently to the balls, entering conveyor 16 and with the carbon entering the hopper 18 and passing out the outlet, carrying therewith carbon separated from the balls. The carbon and gas are taken by a blower pump 21 and passed thence to the carbon extractor 22. From the upper end of the carbon extractor 22 the gas passes through the line 23 to the carbon conversion chamber 2, entering through the circumferential ports 24, as indicated for example in Figure 3. The lower end of the carbon extractor 22 is indicated as provided with a valve 25 leading to carbon packaging member 26.

The helix 20 of the elevator 17 is supported at its bottom by a bearing 27 and driven by means 28 from a motor 29. The top of the elevator 17 is indicated as provided with an inlet line 30 for introduction of hydrocarbons for the process. From the upper end of the elevator 17 the balls are discharged in part to a programming device 31, which consists of a short container 32, an inlet valve 33, and a discharge valve 34 for controlling the movement of the balls through the programming device, and a steam line 35 controlled by a steam valve 36, the valves 34, 36 and 33 being under control of the cam actuated lever 37. The cam actuated lever 37 is connected by linkage 38 to the valve 33 and by linkages 39 and 40 to the valves 34 and 36. In the operation of the programming device, on each cycle of operation of the lever 37 the discharge valve 34 is closed and the inlet valve 33 and steam valve 36 are open to permit the container 31 to be filled with balls and steam under proper pressure. Subsequent movement of the programming device closes the inlet valve 33, opens the discharge valve 34 and closes the steam valve 36, thereby permitting the discharge of the balls and some steam through the inlet pipe 9 leading to the header 8 of the conversion chamber. In this manner, the balls may be re-circulated to the conversion chamber for further reaction with the gas without substantial intermingling between the hydrocarbon gas supplied to the elevator and the hydrogen produced and removed from the conversion chamber.

During the passage of the balls from the elevator to the conversion chamber, a portion of such balls, say for example 10% thereof, is removed through outlet 41, then through valve 42 to a vertical pipe or container 43. The vertical pipe 43 leads to near the bottom of the elevator 17 and connects with the bottom of elevator, as indicated at 44, a valve 45 being indicated near the lower end of the pipe 43. The balls which are removed and passed into the pipe 43 are there accumulated for a period of time and while in said pipe may be subjected to oxidizing action by passing steam through the pipe 43, the steam entering at line 46 through valve 47 and discharging from the pipe 43 through a steam exit line 48 provided with a valve 50. After the balls so accumulated in the pipe 43 have been subjected to the desired oxidizing action, they may be discharged into the bottom of the elevator and continue to be employed in the operation of the process and apparatus. Freshly reduced iron has been found to constitute an effective catalyst for causing a thermal decomposition of hydrocarbon gases into hydrogen and carbon. The activity of the iron as a catalyst rapidly diminishes, however. The precise reason for the loss in catalytic powers of the iron is not known. If the iron which has become inactive as a catalyst for the reaction is removed and first oxidized and thereafter again reduced, its activity is restored. In the process of the present invention it will be appreciated that the portion of the catalyst, for example 10%, which is removed and passed through the oxididing action taking place in the pipe 43, will immediately upon being introduced into the reaction chamber 2 be reduced by the hydrogen there present, and during its subsequent descent and additional cycles through the apparatus will act effectively as a catalyst for decomposing the hydrocarbon gases into hydrogen and carbon.

In the operation of the process and apparatus natural gas in introduced through the inlet 30 to the elevator 17. In the elevator the natural gas moves countercurrently to the other upwardly moving heated balls which are discharging from the conversion chamber. In this manner, the gas is given sufficient preliminary heat to be readily raised to the reaction temperature on passage of the gas into the conversion chamber 2 and the balls are cooled for oxidation. In the conversion chamber 2 the natural gas passes countercurrently upwardly against the downward movement of the balls. Within the conversion chamber 2 the gas and balls are heated to a proper temperature, as by the induction coils 51, 52 and 53 indicated as surrounding the conversion chamber and connected by wires 54 to a source 55 of suitable alternating current. Alternately, the heating of the conversion chamber may be carried out as indicated in Figure 4 where the conversion chamber 2a is indicated as surrounded with a fire brick tube 56 having burners 57 at its lower end, to which oil or gas may be supplied for furnishing the heat necessary for the conversion reaction. In the conversion chamber 2 or 2a the balls should be heated to a temperature ranging from approximately 900° F. to a maximum of 1800° F.

In the conversion chamber 2 the natural gas is broken up by the heat and the catalytic action of the freshly reduced iron or steel ball surfaces into hydrogen, which passes upwardly through the chamber and to carbon, a part of which may be carried up by the gas but the major portion of which is carried down with the balls to be removed therefrom in the hopper 18.

By means of the process and apparatus thus described, it is found possible to continuously produce hydrogen from hydrocarbon gas while maintaining the iron or steel used as a catalyst for the reaction in an active condition.

While the particular process and apparatus herein described is well adapted for carrying out the objects of the present invention, it is to be understood that various modifications and changes may be made, and this invention includes all such modifications and changes as come within the scope of the appended claims.

I claim:

1. An apparatus for producing hydrogen and carbon from the thermal decomposition of hydrocarbon vapors by a catalyst, which comprises a vertical catalyst reaction chamber, a catalyst outlet at the lower end and a catalyst inlet and outlet for reaction products at the upper end of said chamber, means for heating the reaction chamber, a mechanically driven feeding mechanism for introducing catalyst into the top of the reaction chamber, an enclosed conveyor arranged to convey catalyst from the bottom of the reaction chamber to the mechanically driven feeding mechanism, means to introduce reactants to travel countercurrent to the catalyst through the reaction chamber, a tube disposed outside of said enclosed conveyor and communicating at both ends with said enclosed conveyor so arranged as to receive a portion of the catalyst prior to introduction into the catalyst chamber and return said part to the bottom of the conveyor, an inlet at the lower end and an outlet at the upper end of said tube for a treating fluid.

2. An apparatus for producing hydrogen and carbon from the thermal decomposition of hydrocarbon vapors by a catalyst, which comprises a vertical catalyst reaction chamber, a catalyst outlet at the lower end and a catalyst inlet and outlet for reaction products at the upper end of said chamber, means for heating said reaction chamber, a mechanically driven feeding mechanism for introducing catalyst into the top of the reaction chamber, said mechanism including a container having a valve means for selectively closing said container from said reaction chamber and from the supply of catalyst, an enclosed conveyor arranged to convey catalyst from the bottom of the reaction chamber to the mechanically driven feeding mechanism, means to introduce reactants to travel countercurrent to the catalyst through the reaction chamber, a tube disposed outside of said enclosed conveyor and communicating at both ends with said closed conveyor so arranged as to receive a portion of the catalyst prior to its introduction into the catalyst chamber and return said part to the bottom of the conveyor, an inlet at the lower end and an outlet at the upper end of said tube for a treating fluid.

3. An apparatus for producing hydrogen and carbon from the thermal decomposition of hydrocarbon vapors by a catalyst, which comprises a vertical catalyst reaction chamber, a catalyst outlet at the lower end and a catalyst inlet and outlet for the reaction products at the upper end of said chamber, means for heating the reaction chamber, a mechanically driven feeding mechanism for introducing catalyst into the top of the reaction chamber, an enclosed conveyor arranged to convey catalyst from the bottom of the reaction chamber to the mechanically driven feeding mechanism, a carbon-separating screen connected to said conveyor, means to introduce reactants to travel countercurrent to the catalyst through the reaction chamber, a tube disposed outside of said enclosed conveyor and communicating at both ends with said enclosed conveyor so arranged as to receive a portion of the catalyst prior to introduction into the catalyst chamber and return said part to the bottom of the conveyor, an inlet at the lower end and an outlet at the upper end of said tube for a treating fluid.

WALTER GORDON CLARK.